United States Patent
Griffioen et al.

(10) Patent No.: US 12,479,712 B2
(45) Date of Patent: Nov. 25, 2025

(54) FLOW DETECTION CIRCUIT

(71) Applicant: Heineken Supply Chain B.V., Amsterdam (NL)

(72) Inventors: Edwin Johannes Cornelis Griffioen, Amsterdam (NL); Johannes Adriaan Dronkert, Nieuw-Vennep (NL)

(73) Assignee: Heineken Supply Chain B.V., Amsterdam (NL)

(*) Notice: Subject to any disclaimer, the term of this patent is extended or adjusted under 35 U.S.C. 154(b) by 0 days.

(21) Appl. No.: 18/600,034

(22) Filed: Mar. 8, 2024

(65) Prior Publication Data

US 2024/0208791 A1  Jun. 27, 2024

Related U.S. Application Data

(63) Continuation of application No. 15/734,576, filed as application No. PCT/NL2019/050345 on Jun. 6, 2019, now Pat. No. 12,054,379.

(30) Foreign Application Priority Data

Jun. 6, 2018  (NL) .................................. 2021069

(51) Int. Cl.
  B67D 1/08  (2006.01)
  B67D 1/12  (2006.01)
  (Continued)

(52) U.S. Cl.
  CPC .............. B67D 1/0855 (2013.01); B67D 1/08 (2013.01); B67D 1/0888 (2013.01); B67D 1/12 (2013.01);
  (Continued)

(58) Field of Classification Search
  CPC ...... B67D 1/0855; B67D 1/08; B67D 1/0888; B67D 1/12; B67D 1/1247; G01F 1/56;
  (Continued)

(56) References Cited

U.S. PATENT DOCUMENTS 3,131,560 A   5/1964  Cushman et al.
5,065,105 A   11/1991  Bruere et al.
(Continued)

FOREIGN PATENT DOCUMENTS

AU          542637    7/1982
CN       102803907 A  11/2012
(Continued)

OTHER PUBLICATIONS

International Search Report issued in corresponding application No. PCT/NL2019/050345 dated Sep. 13, 2019, 3 pages.
(Continued)

*Primary Examiner* — Frederick C Nicolas
(74) *Attorney, Agent, or Firm* — Banner & Witcoff, Ltd.

(57) ABSTRACT

A dispensing system for a beverage comprises in a tap system a bore for housing a duct. Along the bore, close to or on the duct, at least two electrodes are provided such that at least at some locations along the duct, the two electrodes are provided opposite to one another with the duct in between, thus constituting a capacitor. An oscillating signal is provided to one electrode and a signal is read out from the other electrode. As a beverage is drawn through the duct in a container, capacitance of the capacitor changes. The flowing beverage may have different characteristics, but capacitance may also change as the beverage in the duct is in conducting contact with a container that may be in contact with an earth contact. The change of capacitance results in a change of the amplitude of a detection circuit connected to the second electrode.

15 Claims, 3 Drawing Sheets

(51) Int. Cl.
  *G01F 1/56* (2006.01)
  *G01F 1/58* (2006.01)
  *G01F 13/00* (2006.01)
  *G01F 15/02* (2006.01)
  *G01F 15/14* (2006.01)
  *G01F 23/263* (2022.01)

(52) U.S. Cl.
  CPC ............. *B67D 1/1247* (2013.01); *G01F 1/56* (2013.01); *G01F 1/584* (2013.01); *G01F 13/006* (2013.01); *G01F 15/022* (2013.01); *G01F 15/14* (2013.01); *G01F 23/263* (2013.01); *G01F 23/266* (2013.01); *G01F 13/008* (2013.01)

(58) Field of Classification Search
  CPC ...... G01F 1/584; G01F 13/006; G01F 15/022; G01F 15/14; G01F 23/263; G01F 23/266; G01F 13/008
  See application file for complete search history.

(56) References Cited

U.S. PATENT DOCUMENTS

| | | | |
|---|---|---|---|
| 5,168,714 A | 12/1992 | Farber et al. | |
| 5,304,347 A | 4/1994 | Mann et al. | |
| 5,465,619 A | 11/1995 | Sotack et al. | |
| 6,138,508 A | 10/2000 | Hannan et al. | |
| 6,545,488 B2 | 4/2003 | Yamagishi et al. | |
| 12,054,379 B2 * | 8/2024 | Griffioen | B67D 1/12 |
| 2002/0070734 A1 | 6/2002 | Engebretsen et al. | |
| 2004/0199131 A1 | 10/2004 | Kitamura | |
| 2004/0238562 A1 | 12/2004 | Mathues | |
| 2010/0005903 A1 | 1/2010 | Beavis | |
| 2013/0257455 A1 | 10/2013 | Ahne | |
| 2019/0144254 A1 | 5/2019 | Hutchinson et al. | |
| 2021/0229973 A1 | 7/2021 | Griffioen | |
| 2022/0228893 A1 | 7/2022 | Griffioen et al. | |
| 2022/0404184 A1 | 12/2022 | Griffioen | |

FOREIGN PATENT DOCUMENTS

| | | |
|---|---|---|
| CN | 103697952 A | 4/2014 |
| CN | 205182270 U | 4/2016 |
| DE | 10210982 C1 | 8/2003 |
| DE | 102016210982 | 12/2017 |
| EP | 0144111 A1 | 6/1985 |
| FR | 2286368 | 4/1976 |
| GB | 2338558 | 12/1999 |
| JP | A03165219 | 7/1991 |
| JP | 2003090749 A | 3/2003 |
| JP | 2004-12402 A | 1/2004 |
| WO | 9322235 | 11/1993 |
| WO | 2017194929 | 11/2017 |
| WO | 2019235931 | 12/2019 |

OTHER PUBLICATIONS

International Search Report for corresponding International Application No. PCT/NL2020/050371 dated Sep. 11, 2020, 3 pages.

* cited by examiner

FLOW DETECTION CIRCUIT

CROSS-REFERENCE TO RELATED APPLICATIONS

This application is a continuation of U.S. application Ser. No. 15/734,576, filed on Dec. 3, 2020, which is a US National Phase of PCT/NL2019/050345 filed on Jun. 6, 2019, which claims the benefit of Netherlands Application No. 2021069 filed on Jun. 6, 2018. These applications are incorporated herein by reference.

TECHNICAL FIELD

The various aspects and embodiments thereof relate to a circuit and device for detection of a flow through a duct as part of a system for dispensing beverages, using a capacitive sensor.

BACKGROUND

U.S. Pat. No. 6,545,488B2 discloses a system for capacitive flow measurement through a duct in a large transportation system. Two electrodes are helically wound around the duct and a signal is applied to the electrodes. Upon change of flow through the duct, a frequency of a signal in a detection circuit varies. The detection is transformed to a voltage signal, which is used for further processing.

SUMMARY

When using variation of capacitance for changing an oscillating frequency, use of an inductance is highly preferred. Inductances are bulky and relatively expensive circuit components. Furthermore, for further conversion of frequency changes to a voltage signal, a significant amount of circuitry is required. It is preferred to provide a more efficient arrangement for detecting flow through the duct of a beverage dispensing system.

A first aspect provides a circuit for detecting a flow through a duct of a tap for dispensing beverages. The circuit comprises an alternating signal source having a signal terminal arranged to provide an alternating signal to a capacitive element comprising two electrodes provided at opposite sides of the duct along at least part of the length of the duct and a detection circuit. The detection circuit is arranged to be connected to the capacitive element and arranged to detect a signal amplitude value, the detection circuit being arranged to provide a detection signal based on the signal amplitude value at a detection terminal comprised by the detection circuit. The flow detection circuit also comprises a processing circuit arranged to receive the detection signal, determine whether the detection signal satisfies a pre-determined criterion; and provide a flow signal if the pre-determined criterion is met.

This system works with one frequency throughout the circuit, thus reducing complexity. Furthermore, it may be implemented in the analogue domain, in the digital domain or partially in the analogue domain and partially in the digital domain without departing from the scope of this aspect.

In an implementation, the alternating signal source has a signal terminal arranged to be connected to a first capacitor electrode provided along at least part of a length of the duct and the detection circuit is arranged to be connected to a second capacitor electrode provided along at least part of a length of the duct for receiving an electrode signal.

A further implementation further comprises an adding circuit for summing the detection signal and a reference control signal for providing a controlled detection signal, wherein the processing circuit is further arranged to provide a reference control signal based on the controlled detection signal.

The skilled person will understand that a subtractor also falls within the definition of an adder. With this implementation, large variation in the amplitude of the signal at the second electrode may be controlled within boundaries such that detection of flow and characteristics of the flow may be more convenient.

In another implementation, the detection circuit comprises a peak detection circuit and the detection signal is based on the output of the peak detection signal. Whereas other types of circuit may be used for determining an amplitude value, like multipliers, a peak detector is preferred for determining amplitude.

In yet another embodiment, the detection circuit is arranged to detect fluctuations of charge on the second electrode and to provide a voltage signal based on the detected fluctuations. Whereas the circuit may be implemented as current based, voltage based circuitry is preferred.

A second aspect provides a casing for housing a duct for a beverage dispensing tap. The casing comprises an elongate bore having a proximal opening and a distal opening for housing and guiding the duct, a first electrode provided over at least part of the length of the bore and a second electrode provided over at least part of the length of the bore. In this casing, the first electrode is arranged to be connected to the signal terminal of a circuit according to any of the preceding claims; and the second electrode is arranged to be connected to the detection terminal of a circuit according to the first aspect. Such casing comprises the electrodes preferred for operation of the circuit according to the first aspect, providing an advantageous arrangement for housing a duct for dispensing beer—or another beverage—and detection flow of the beer.

In an embodiment, the casing comprises a first shell and a second shell, the first shell comprising a first elongate recess and the second shell comprising a second elongate recess such that when the first shell and the second shell are joined for forming the case, the first recess and the second recess provide at least part of the duct. This casing is advantageous for use of a disposable duct, which may be conveniently inserted and removed from the bore. Furthermore, if the casing is provided by means of two halves, electrodes and circuitry may all be provided on one and the same shell part.

A third aspect provides a dispensing device for dispensing a beverage. The device comprises the casing according to the second aspect, the circuit according to the first aspect. In this device, the first electrode is connected to the signal terminal; and the second electrode is connected to the detection terminal.

BRIEF DESCRIPTION OF THE DRAWINGS

The various aspects and implementations thereof will now be elucidated in conjunction with drawings. In the drawings.

DETAILED DESCRIPTION

Figure 1:
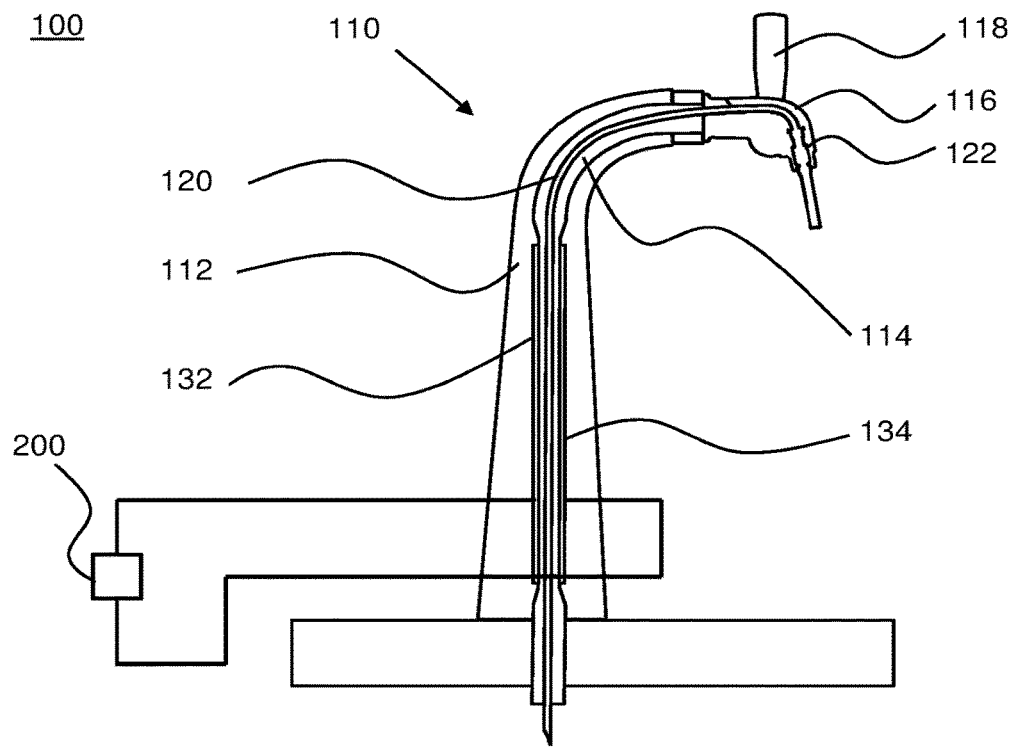
FIG. 1: shows a beverage dispensing system.

FIG. 1 shows a beer dispensing system 100 as an implementation of a dispensing device for dispensing beverages.

The beer dispensing system 100 comprises a duct 120 for providing or forming a channel for beer to flow from a reservoir like a keg or a large tank (not shown) to a dispense valve 122. The valve 122 can be an integral part of the duct, or the 120 duct can be coupled to the valve 122. The duct 120 is or at least comprises preferably a flexible and more preferably a resilient tube comprising an organic polymer, like PVC, silicon, polyethylene, other, or a combination thereof.

The duct 120 is provided in and extends through a bore 114 in a casing 112 that constitutes a stand for a dispense tap 116. The dispense tap 116 comprises a tap handle 118 for operating the dispense valve 122. Within the casing 112, a first electrode 132 and a second electrode 134 are provided. The first electrode 132 and the second electrode 134 are provided such that they are located at opposite sides of the duct 120 for at least a part of the length of the duct 120.

Such constellation may be achieved by providing the first electrode 132 and the second electrode 134 in the casing, at opposite sides at the inner wall of the bore 114 and substantially parallel to the length of the bore 114 and the duct 112. In this constellation, the electrodes are provided opposite to one another over their full lengths. Alternatively, the electrodes are provided in any other way such that they are provided at opposite sides at least for one or more parts of the length of the bore 114.

The beer dispensing system further comprises a flow detection circuit 200 for detecting whether beer is drawn from the reservoir using the beer dispensing system 100. The flow detection circuit 200 is connected to the first electrode 132 and the second electrode 134.

The casing may be provided by means of two shells to facilitate removal and insertion of the duct 120. This is particularly advantageous if the duct 120 is a disposable duct. In such embodiment, the first electrode 132 and the second electrode 134 are preferably provided on the same shell part, together with a flow detection circuit 200. The duct 120 may be embedded in a first shell having a recess as part of the bore 114.

Subsequently, a second shell is joined with the first shell for forming the casing 112. Alternatively, the duct 120 is led through the bore 114 with a closed bore, i.e. with the two halves joined, or, if the casing 112 mainly comprises a single unit through which the bore is provided. The duct 120 may be inserted in the bore 114 from above or below, in the constellation shows by FIG. 1. The bore 114 may be provided inside a massive casing 112 or as a tube or pipe, either rigid or flexible, in a hollow casing 112.

The shape and dimension of the cross-section of the bore 114 may vary or be substantially the same over the length of the bore 114. The duct 120 is preferably provided inside the bore 114 such that it does not contacts the first electrode 132 and the second electrode 134. Whereas the duct 120 is preferably provided as a flexible dispensing line predominantly comprising an organic polymer that is electrically insulating, liquid and water condensation in particular, may provide a conductive path. Therefore, the duct 120 is provided at a distance from the first electrode 132 and the second electrode 134. Alternatively or additionally, the first electrode 132 and the second electrode 134 are provided with an insulating film, at least at a side facing the inner space of the bore 114.

The bore 114 may be provided as a rigid guide for the duct 120 or as a flexible guide. In the latter case, the bore 114 may be provided comprising a flexible tubing inside which tubing the duct 120 may be provided.

Figure 2:
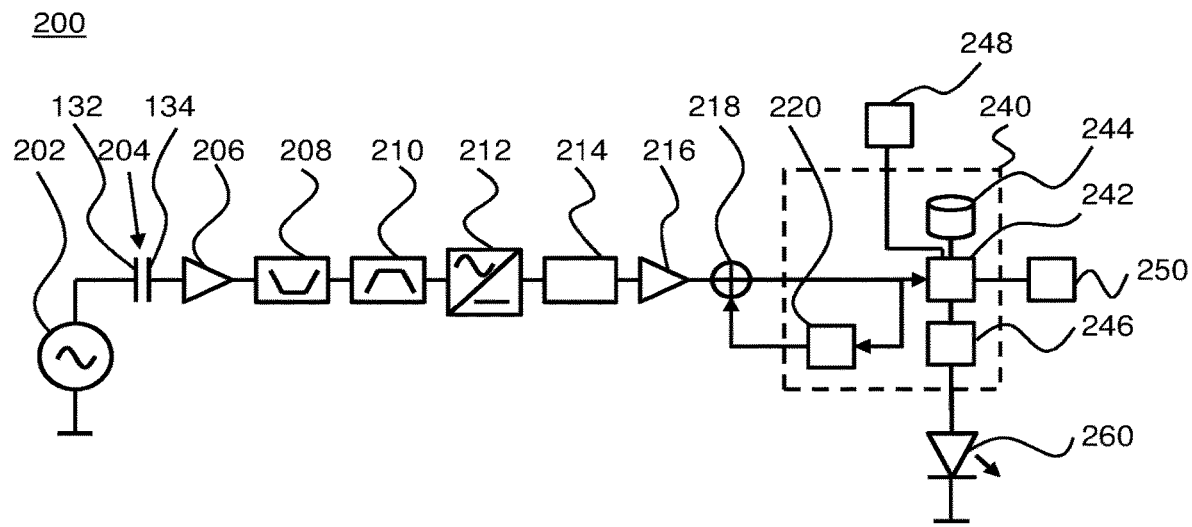
FIG. 2: shows a flow detection circuit.

FIG. 2 shows the flow detection circuit 200 in further detail. FIG. 2 shows functional components preferred for implementing the flow detection circuit 200. The flow detection circuit 200 comprises a signal generator 202 for providing an alternating signal, as a voltage source or a current source. Preferably, the signal generator 202 generates a sine wave, preferably at a frequency between 1.5 kHz and 3 kHz, more preferably between 2 kHz and 2.5 kHz and most preferably at 2.3 kHz. It is noted that depending on the values of the various components, other values of the frequency may be selected, between 1 kHz and 4 kHz, between 5 kHz and $10^1$ kHz, between $10^1$ kHz at $5 \cdot 10^1$ kHz or above, even up to 102 kHz and up.

In another implementation, the signal generator generates another wave form, including at least one of a triangular signal, a block wave, a saw tooth signal, other, or a combination thereof. The frequency of the signal is preferably set, though it may be variable.

The generated signal is applied to the first electrode 132. The signal may optionally be provided via a buffer, decoupling capacitor, a resistor, another type of impedance or a combination thereof. Together with the second electrode 134, the first electrode 132 constitutes a capacitor 204. Variations of charge on the first electrode 132 due to the alternating signal applied will result in variations of charge on the second electrode 134—as is the basic principle of a capacitance like the capacitor 204.

The fluctuations in charge on the second electrode 134 result in an alternating current at the second electrode 134. The amount of the fluctuation depends on characteristics of the medium between the first electrode 132 and the second electrode 134. Such characteristics include, but are not limited to, distance between the electrode, permittivity of the medium or media between the electrodes and other characteristics of the medium or media.

The alternating current is provided to an amplifier and preferably to a trans impedance amplifier 206 for converting the alternating current to an alternating voltage. The alternating voltage has the same frequency as the signal provided by the signal generator 202. The amplified voltage signal is provided to a band stop filter or notch filter 208 which has a centre frequency substantial equal to a frequency of mains voltage supply. For the majority of the world this is 50 Hz, for some regions including the Americas this is 60 Hz. At some locations, other frequencies may apply. Alternatively or additionally, for reducing influence of the mains power grid, the casing 112 may be provided with shielding for reducing electromagnetic interference on the flow detection circuitry.

The alternating signal is subsequently provided to a bandpass filter 210. The bandpass filter 210 has a centre frequency substantially equal to the frequency of the signal provided by the signal generator 202. The bandpass filter 210 may be provided comprising capacitances and inductances as to define slopes and centre frequency independently. However, as inductances may be bulky and relatively expensive, use of a multiple feedback bandpass filter (MFB filter) is preferred.

The signal thus filtered is provided to a rectifier 212. The rectifier 212 is in this implementation a half-bridge rectifier. Alternatively, the rectifier 212 may be implemented as a full bridge rectifier. However, the input signal is a data signal of which only the top output level of the rectified signal is relevant, for which reason not the full signal is required to be rectified—as opposed to a power signal. The rectified signal is provided to a level detection circuit 214 for detecting a peak level of the rectified signal. Of the filtered and rectified signal, the peak level is determined and the level detection circuit and the output of the peak detector 214 is provided to an amplifier 216.

The amplified signal at the output of the amplifier is provided to a feedback control loop. The feedback control loop comprises an adder 218—which may with minor design modifications also be implemented as a subtractor—and a control circuit 220. The control circuit 220 is preferably implemented as a PID control circuit 220—a proportional—integral—derivative controller.

The PID control circuit 220 is preferably provided as part of a microcontroller 240. Hence, the output of the adder 218 is sampled and digitised prior to being provided to the PID control circuit 220. The output of the PID control circuit 220 is initially digital and converted to the analogue domain prior to being provided to the adder 218.

A reason for providing the feedback control loop is that depending on the container in which beer is dispensed into, such as a glass or a jug, the variations in the signals may vary significantly in magnitude. The feed control loop ensures the analogue output of the circuit as provided to the microcontroller is provided in the proper range, for example between 0 and 5 Volt, between 0 and 3.3 Volt, between 0 and 2.5 Volt or another range.

The digitised signal provided to the PID control circuit 220 is also provided to a central control circuit 242. The central control circuit 242 is part of the microprocessor 240 of which the functionality may be programmed or already available upon manufacturing. The central control circuit evaluates the digitised output signal of the adder 218—the controlled signal—to one or more pre-determined values. These values may be stored in a storage module 244, either provided separately or as part of the microcontroller 240.

The values may also be adjusted based on ambient temperature. To that purpose, the microcontroller 240 is connected to a temperature sensor 250.

If the controlled signal is above or below a particular pre-determined value, it may be determined that beer is dispensed from the beer dispensing system 100. It has been determined that as beer is being dispensed from the beer dispensing system 100, the level of the alternating current at a terminal of the second electrode varies. This variation of the amplitude of the received capacitor current depends on a type of container used—glass, jug, pitcher or bucket—and how the container is being held—by the full hand or by the tips of a few fingers only.

Hence, as the controlled signal is at a particular value, it may firstly be detected that beer is being drafted and in a container in particular, such as a pitcher, a jug or a glass. Second, it may be established in what type of container-pitcher, glass, jug-beer is being drafted. Third, it may be established how the container is being held. Fourth, as detection is based on the duct 120 being present in the bore 114, between the first electrode 132 and the second electrode 134, it may be detected whether the duct 120 is present at all. Accordingly, a dispensing device is provided for dispensing a beverage, the device comprising a casing for housing at least part of a duct for a beverage dispensing tap, the casing comprising an elongate bore having a proximal opening and a distal opening for housing and guiding the duct, a first signal electrode provided over at least part of the length of the bore, a second signal electrode provided over at least part of the length of the bore, a circuit for detecting a flow through a duct of a tap for dispensing beverages, the circuit comprising an alternating signal source having a signal terminal arranged to provide an alternating signal to a capacitive element comprising two electrodes provided adjacent to the duct along at least part of the length of the duct and the signal source further comprising a zero terminal, the signal terminal being connected to the first signal electrode, a detection circuit arranged to be connected to the capacitive element and arranged to detect a signal amplitude value, the detection circuit being arranged to provide a detection signal based on the signal amplitude value at a detection terminal comprised by the detection circuit, the detection terminal being connected to the second signal electrode, a processing circuit arranged to receive the detection signal, determine whether the detection signal satisfies a pre-determined criterion, provide a flow signal if the pre-determined criterion is met, determine whether the detection signal satisfies a further pre-determined criterion, and provide a signal if the further pre-determined criterion is met for indicating that no duct is provided in the bore.

Based on the determinations, further data processing may be executed. A proper beer is being drafted by fully opening the valve 122 of the tap 116, commonly executed by swivelling the tap handle 118 by e.g. about ninety degrees. This means that the dispense valve is either open or closed; the flow is either maximal or zero. If the period in time of drafting may be determined based on processing of the controlled signal (or another signal in the chain) is multiplied by the maximum flow, the amount of beer drafted may be calculated. In this way, a pre-warning may be issued in case a keg or other reservoir is almost empty.

The microcontroller 240 also comprises an actuator circuit 246 which may be programmed or already available upon manufacturing. The actuator circuit is arranged to control an actuator outside the microcontroller 240, like the light emitting diode 260. The light emitting diode 260 may provide a lighting functionality for lighting the casing 112 or part thereof. Alternatively or additionally, other light sources, a display screen for showing text, video or still images, an audio source or other peripheral devices may be controlled.

With the type of container determined, the type of container may be shown on a screen close to the dispensing system 100. And if it is determined how the container is being held, feedback may be provided to a person using the dispensing system 100. For example, if it is preferred a glass is being held by the tips of fingers rather than the full hand, the user may be informed to take corrective action if it is determined the glass is being held by the full hand.

Another action may be taken by a remotely located actuator. To that purpose, the flow detection circuit comprises a communication module 248 connected to the central control circuit 242—or another part of the microcontroller 240. Instructions to remotely located actuators may be provided to the communication module 248, which transfers the instructions using a protocol like IEEE 802.11, popularly known as WiFi, Zigbee, Bluetooth, LoRa, an LTE protocol, other, or a combination thereof. Alternatively or additionally, data may be received via the communication module 248, for example for programming the microcontroller 240.

The dispensing system 100 thus provided is preferably used for dispensing beer, but it may also be used for dispensing other beverages like cider, alcopops or soft drinks.

The filters used in the flow detection circuit 200 are preferably active filters, which may be implemented using commercially available operational amplifiers.

In the embodiments discussed above, the first electrode 132 and the second electrode 134 are provide at either side of the bore 114—or the duct 112, for that matter—and the first electrode 132 is connected to the signal generator 202 and the second electrode 134 is connected to the signal detection circuit right of the capacitive element the capacitor 204 embodies. In another embodiment, the capacitor 204 is provided in a capacitive divider, in series with or parallel to a further capacitive element having a substantially fixed capacity value.

As the capacity value of the capacitor 204 changes upon beer being drawn through the duct 112 and amplitude of a signal provided by the signal generator changes, depending on the configuration, a change of current through or voltage over the capacitor 204 and/or through/over the further capacitor may change. This change may be detected and used to determine whether a liquid flowing through the duct is dispensed in a container. In case the capacitors are connected in parallel, a change in current is to be detected and in case the capacitors are connected in series, a change in voltage is to be detected. It is noted that this relates to the amplitude of the signal, rather than the actual value.

Figure 3:
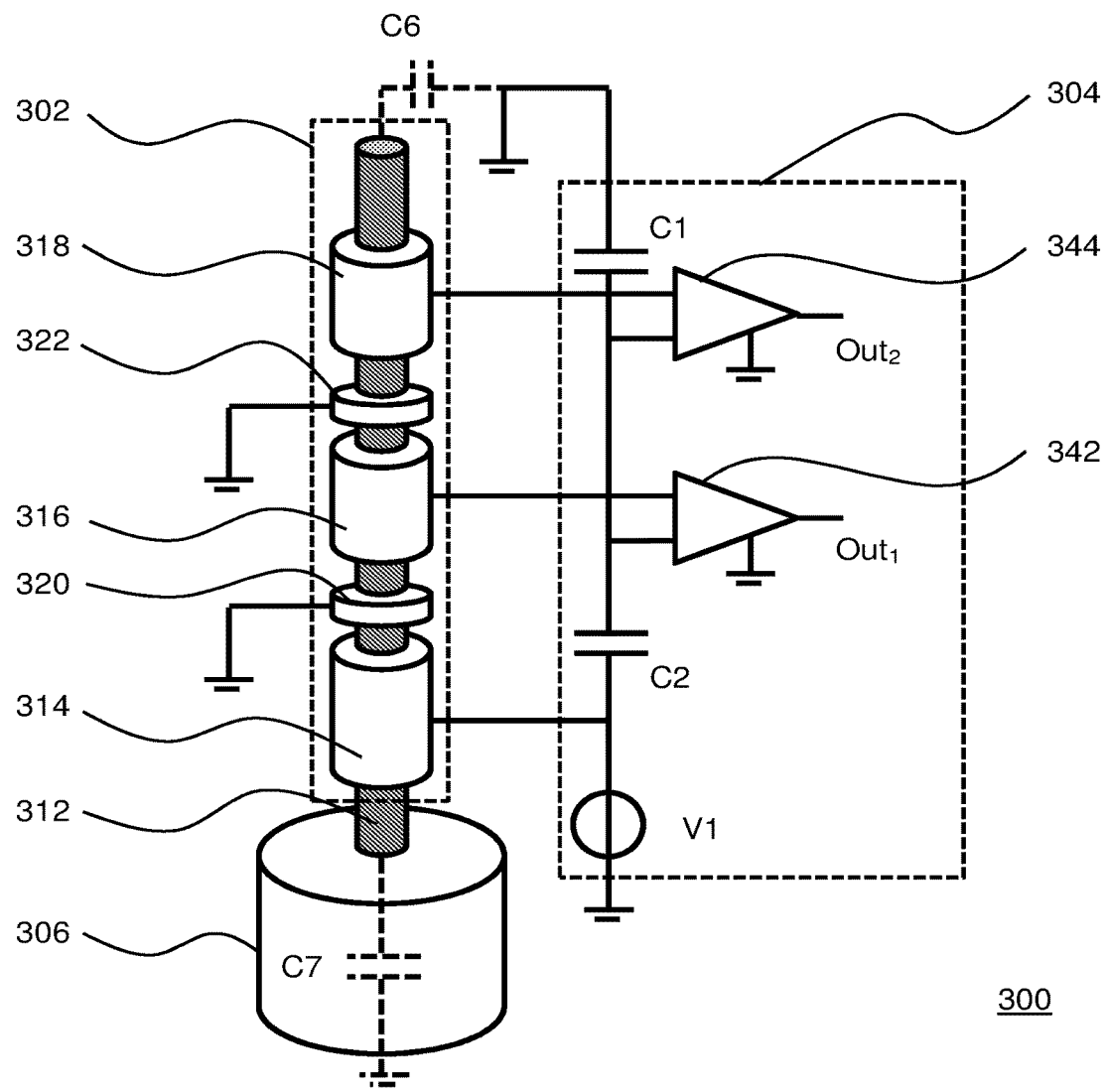
FIG. 3: shows another flow detection circuit.

FIG. 3 shows a sensing arrangement 300 as another implementation of a sensing setup according to the aspects discussed above for use in, for example, the beer dispensing system 100. FIG. 3 shows the sensing arrangement 300 comprising beer conduit module 302 and a sensing module 304. The beer conduit module 302 comprises a beer conduit 312 connected at a distal end to a beer keg 306 arranged to hold beer—or another dispensable liquid—and connected at a proximal end to a tap like the dispense tap 116 as shown by FIG. 1.

Around the beer conduit 312, a transmitter electrode 314, a first receiving electrode 316 and an optional second receiving electrode 318 are provided. Between the transmitter electrode 314 and the first receiving electrode 316, an optional first shielding electrode 320 is provided and between the first receiving electrode 316 and the second receiving electrode 318, an optional second shielding electrode 322 is provided. The electrodes are preferably not provided in direct contact with the beer conduit, but this may be the case in another implementation.

The electrodes preferably fully surround the beer conduit 312. In an implementation in which the casing 112 (FIG. 1) is provided having two or more shell parts, the electrodes may be constituted as comprising multiple electrode parts, wherein each part is comprises by a shell part of the casing 112. With the casing 112 assembled, the electrode parts of each electrode are in conductive contact with one another— but not with parts of other electrodes. In another implementation, not all shell parts comprise parts of each electrode, in which case each electrode may not fully surround the beer conduit 312.

Preferably, the shielding electrodes, if present, are—measured along the length of the beer conduit 312—preferably shorter than the transmitter electrode 312, the first receiving electrode 316 and the second receiving electrode 318. The shielding electrodes are connected to ground level or to the zero reference of the signal source V1.

The sensing module 304 comprises a signal source V1, a first reference capacitor C1 and a second reference capacitor C2. The signal source V1 is substantially the same, similar or at least equivalent to the signal generator 202 of FIG. 1, unless indicated otherwise.

The signal source V1 is at a first terminal connected to earth or a zero reference and at a second terminal connected to the transmitter electrode 314 and a first terminal of the second reference capacitor C2. Between a second terminal of the second reference capacitor C2 and a first terminal of a first reference capacitor C1, a reference voltage terminal is provided, with a reference voltage. A second terminal of the first reference capacitor C1 is connected to ground level or the zero reference terminal of the signal source V1.

The sensing module 304 comprises a first signal comparator 342 and a second signal comparator 344. The signal comparators are arranged to compare analogue input signals and to provide an output signal in response to the comparing operation. The signal comparators may be implemented using analogue operational amplifier circuits. Alternatively or additionally, the comparing of signals may be executed in a digital domain. To that end, the signal comparators may comprise analogue to digital converters.

The comparing by the signal comparators may take place instantaneously, in a continuous time domain. Alternatively or additionally, the comparing may take place in an amplitude domain, comparing amplitudes of the reference voltage and a voltage as sensed by means of the first receiving electrode 316 and the second receiving electrode 318. Such comparing in the amplitude domain may takes place continuously or at regular intervals, for example every fifth, tenth or twentieth of a second to every one or two seconds.

A first signal comparator 342 is connected to the first receiving electrode 316 and the reference voltage terminal. A second signal comparator 344 is connected to the second receiving electrode 318 and the reference voltage terminal. In this configuration, the first signal comparator 342 compares voltages on the first signal electrode to 316 the reference voltage and the second signal comparator 344 compares voltage on the second signal electrode 318 to the reference voltage.

The comparators provide an output signal based on a difference between the input voltages. Further signal processing, prior to comparing, after comparing or both, may take place, in a way as discussed in conjunction with FIG. 2, otherwise, or a combination thereof.

FIG. 3 shows a parasitic capacitance C6 from the beer conduit 302 to ground to model a connection between the beer conduit 302 and ground via a person drawing a beer. Furthermore, a keg parasitic capacitance C7 is drawn to model a capacitance from the beer conduit 302 to ground via the beer keg 306 and the beer conduit 302.

Figure 4:
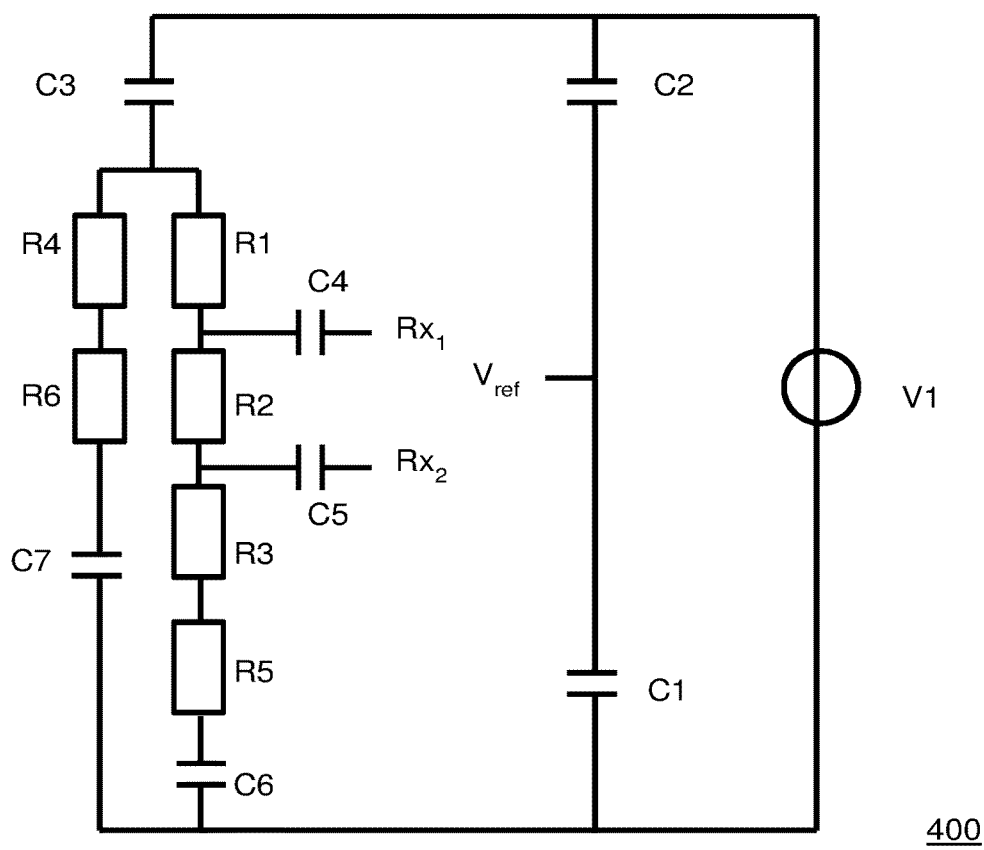
FIG. 4: shows an electrical circuit equivalent of the other flow detection circuit.

FIG. 4 shows an equivalent circuit diagram 400 of the configuration depicted by FIG. 3. FIG. 4 shows the first reference capacitor C1 and the second reference capacitor C2. FIG. 4 also shows a first receiving terminal Rx providing an input to the first comparator 342 and a second receiving terminal Rx providing an input to the second comparator 344. The transmitting electrode 314 is modelled as a transmitting capacitance C3, the first receiving electrode 316 is modelled as a first receiving capacitance C4 and the second receiving electrode 318 is modelled as a second receiving capacitance C5.

The beer conduit 312 is modelled as a chain of resistances; a first conduit resistance R1 between the transmitting electrode 314 and the first receiving electrode 316 and a second conduit resistance R2 between the first receiving electrode 316 and the second receiving electrode. The proximal end of the beer conduit 312 up to the dispense tap 116 is modelled as a third conduit resistance R3 and the dispense tap 116 itself is modelled as a tap resistance R5. The distal end of the beer conduit 312 between the transmitting electrode 314 and the keg 306 is modelled as a fourth conduit resistance R4 and the resistance over the keg to keg parasitic capacitance C7 is modelled as a keg resistance R6.

During a dispensing operation of the beer dispensing system 100, while dispensing beer, at least one of the modelled conduit resistances and the transmitting electrode 314 and the receiving electrodes changes. As a result, the voltages at the first receiving terminal $Rx_1$ and the second receiving terminal $Rx_2$ change. With the values of first reference capacitance C1 and the second reference capacitance C2 being substantially constant, the reference voltage is substantially constant.

Variation of at least on value of capacitances and/or resistances at one side of the bridge and no substantial change at the other side of the capacitive bridge circuit allows the first comparator 342 and the second comparator 344 to determine the change in the value of at least one of the modelled conduit resistances and the transmitting electrode 314 and the receiving electrodes by determining differences between the reference voltage and the voltages at the first receiving terminal $Rx_1$ and the second receiving terminal $Rx_2$.

It is noted that the second sensing electrode 318 and the second comparator 344 are optional, yet preferred for increasing accuracy of determining a flow through the beer conduit 312 and optionally the amount of the flow.

In the description above for FIG. 3 and FIG. 4, it is noted that certain elements may be connected to a zero references or a ground terminal. A ground terminal is defined as a terminal having a fixed voltage level—usually zero—relative to the earth. A zero reference level is a voltage level of one terminal of a voltage supply or another particular terminal in a circuit. In the implementations discussed above, this terminal is the lower terminal of voltage source V1 as depicted by FIG. 3. The zero reference is not always the same as the voltage level of the ground terminal (the ground level), as the zero reference may float relative to the ground level. The zero reference is only equal to the ground level if the zero reference terminal is connected to ground—like the protected earth of a wall socket or similar or equivalent.

Referring to FIG. 3, the shielding electrodes are connected to the same level as the zero reference of V1, as is the terminal of the first reference capacitance C1 opposite to the reference terminal. These nodes may be connected to earth, but this does not have to be the case. The parasitic keg capacitance C7 is at the terminal opposite to the distal end of the beer conduit 312 to ground. The latter is the case, as the beer keg 306 is commonly placed in a beer cellar and/or refrigerator, away from the beer dispensing system 100, which does not provide a feasible option for connecting the zero reference to the environment of the beer keg 306.

In another implementation, the signal provided on the first receiving electrode 316 and the second receiving electrode 318 is not compared to a voltage of the capacitive divider constituted by C1 an C2, but fed to the circuit depicted by FIG. 2, with the signal on the receiving electrodes being provides to the trans impedance amplifier 206. Alternatively, an equivalent circuit may be provided, with or without the appropriate filters, in analogue or digital form. In such embodiment, the first reference capacitance C1 and the second reference capacitance C2 may be omitted. Additionally or alternative, the first comparator 342 and the second comparator 344 may be omitted.

Likewise, the electrodes depicted by FIG. 1 May also form part of a capacitive bridge circuit as depicted by FIG. 3 and FIG. 4.

In summary, the aspects relate to a dispensing system for a beverage comprising in a tap system a bore for housing a duct. Along the bore, close to or on the duct, at least two electrodes are provided such that at least at some locations along the duct, the two electrodes are provided opposite to one another with the duct in between, thus constituting a capacitor. An oscillating signal, preferably have a sine waveform, is provided to one electrode and a signal is read out from the other electrode. As a beverage is drawn through the duct into a container, capacitance of the capacitor changes. The flowing beverage may have different characteristics, but capacitance may also change as the beverage in the duct is in conducting contact with a container that may be in contact with an earth contact. The change of capacitance results in a change of the amplitude of a detection circuit connected to the second electrode.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A dispensing device for dispensing a beverage, the device comprising:
   a casing for housing at least part of a duct for a beverage dispensing tap, the casing comprising:
   an elongate bore having a proximal opening and a distal opening for housing and guiding the duct;
   a first signal electrode provided over at least part of a length of the bore;
   a second signal electrode provided over at least part of a length of the bore;
   a circuit for detecting a flow through the duct of the tap for dispensing beverages, the circuit comprising:
   an alternating signal source having a signal terminal arranged to provide an alternating signal to a capacitive element comprising two electrodes provided adjacent to the duct along the at least part of the length of the duct and the signal source further comprising a zero terminal, the signal terminal being connected to the first signal electrode;
   a detection circuit arranged to be connected to the capacitive element and arranged to detect a signal amplitude value, the detection circuit being arranged to provide a detection signal based on the signal amplitude value at a detection terminal comprised by the detection circuit, the detection terminal being connected to the second signal electrode for receiving an electrode signal;

a processing circuit arranged to:

receive the detection signal;

determine whether the detection signal satisfies a pre-determined criterion;

provide a flow signal if the pre-determined criterion is met;

determine whether the detection signal satisfies a further pre-determined criterion; and provide a signal if the further pre-determined criterion is met for indicating that no duct is provided in the bore.

2. The dispensing device according to claim 1, further comprising an adding circuit for summing the detection signal and a reference control signal for providing a controlled detection signal, wherein the processing circuit is further arranged to provide the reference control signal based on the controlled detection signal.

3. The dispensing device according to claim 2, the processing circuit further comprising a proportional-integral-derivative (PID) controller for generating the reference control signal.

4. The dispensing device according to claim 1, wherein the detection circuit comprises a peak detection circuit and the detection signal is based on the output of an peak detection circuit.

5. The dispensing device according to claim 4, further comprising a rectifier for rectifying the electrode signal and providing a rectified electrode signal to the peak detection circuit.

6. The dispensing device according to claim 1, further comprising a temperature sensor for providing a temperature signal based on a sensed temperature, the temperature sensor being coupled to the processing circuit;

wherein the pre-determined criterion is based on the temperature signal.

7. The dispensing device according to claim 1, further comprising an actuator connected to the processing circuit, wherein the processing circuit is arranged to actuate the actuator based on the flow signal.

8. The dispensing device according to claim 1, wherein:

the first signal electrode at least partially surrounds the bore;

the second signal electrode at least partially surrounds the bore; and the first signal electrode and the second signal electrode are spaced apart along the at least part of the length of the bore.

9. The dispensing device according to claim 8, further comprising a third signal electrode between the first signal electrode and the second signal electrode, wherein the third signal electrode is arranged to be connected to a further detection circuit.

10. The dispensing device according to claim 8, further comprising at least one shielding electrode provided between at least two adjacent signal electrodes, the shielding electrode arranged to be connected to at least one or the alternating zero terminal of the signal source of the circuit.

11. The dispensing device according to claim 8, wherein the first signal electrode and the second signal electrode fully surround the bore.

12. The dispensing device according to claim 1, wherein the first electrode and the second electrode are provided opposite to one another relative to the length of the bore.

13. The dispensing device according to claim 1, wherein the casing comprises a first shell and a second shell, the first shell comprising a first elongate recess and the second shell comprising a second elongate recess such that when the first shell and the second shell are joined for forming the casing, the first recess and the second recess provide at least part of the bore.

14. The dispensing device according to claim 1, further comprising the tap arranged to control the flow of the beverage through the duct.

15. The dispensing device according to claim 1, wherein:

the first signal electrode at least partially surrounds the bore;

the second signal electrode at least partially surrounds the bore; and the first signal electrode and the second signal electrode are spaced apart along the at least part of the length of the bore; and the detection circuit further comprises a comparing terminal and is arranged to provide the flow signal based on a difference between a first signal value on the signal terminal and a second signal value on the comparing terminal;

the device further comprising:

a first capacitance provided between the comparing terminal and the signal terminal of the signal source; and a second capacitance provided between the comparing terminal and at least one of the zero terminal or a ground terminal.

* * * * *